Aug. 20, 1963     L. B. SCOTT ETAL     3,101,117
WELL TREATING METHOD AND APPARATUS

Original Filed Oct. 16, 1956     7 Sheets-Sheet 1

INVENTORS
LYLE B. SCOTT
MATHEW B. RIORDAN, JR.
BY Lyon & Lyon
ATTORNEYS

INVENTOR.
LYLE B. SCOTT
MATHEW B. RIORDAN, JR.
BY
Lyon & Lyon
ATTORNEYS

Aug. 20, 1963 L. B. SCOTT ETAL 3,101,117
WELL TREATING METHOD AND APPARATUS
Original Filed Oct. 16, 1956 7 Sheets-Sheet 3

INVENTORS
LYLE B. SCOTT
MATHEW B. RIORDAN, JR.
BY
Lyon & Lyon
ATTORNEYS

INVENTORS
LYLE B. SCOTT
MATHEW B. RIORDAN, JR.
BY
Lyon & Lyon
ATTORNEYS

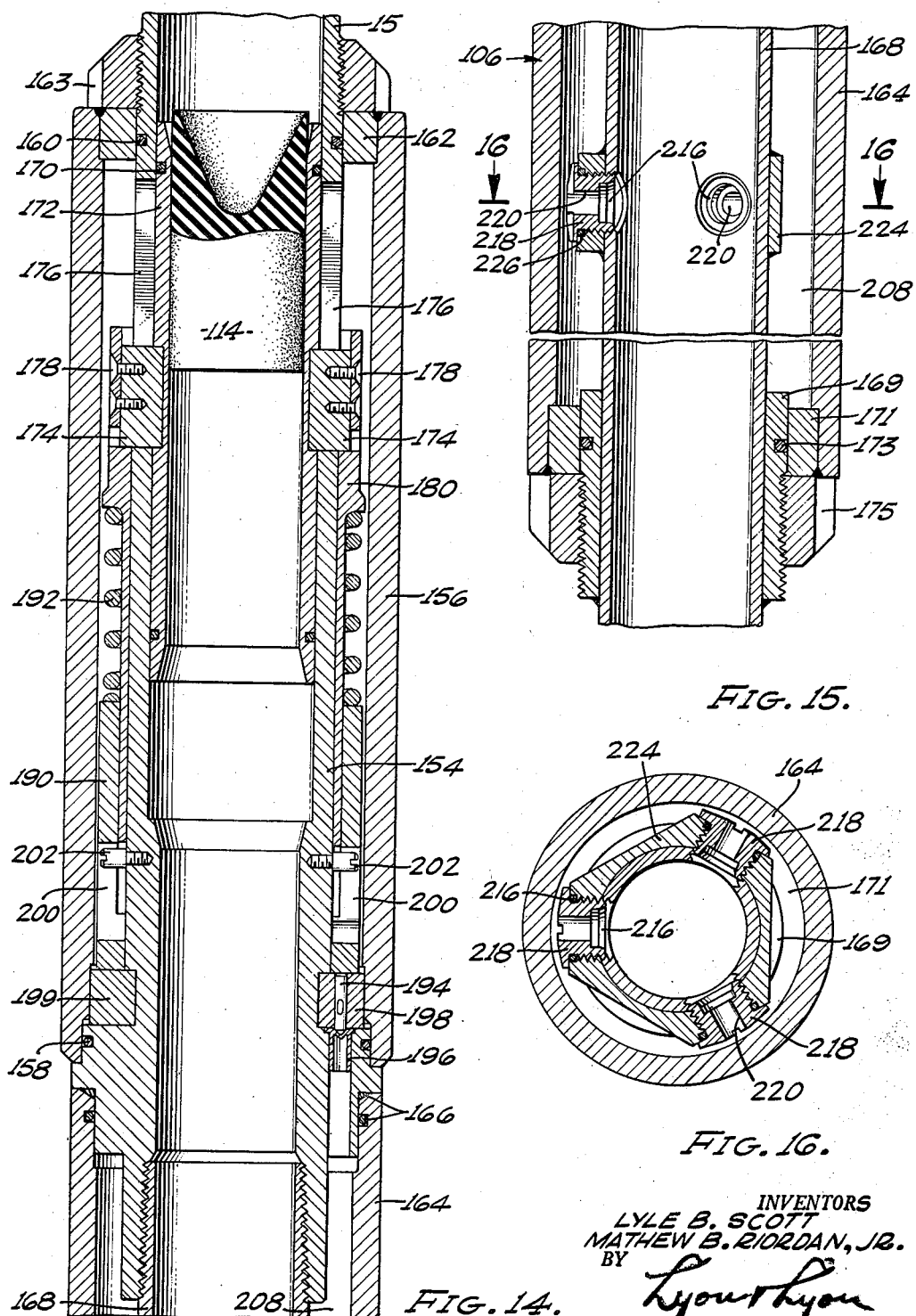

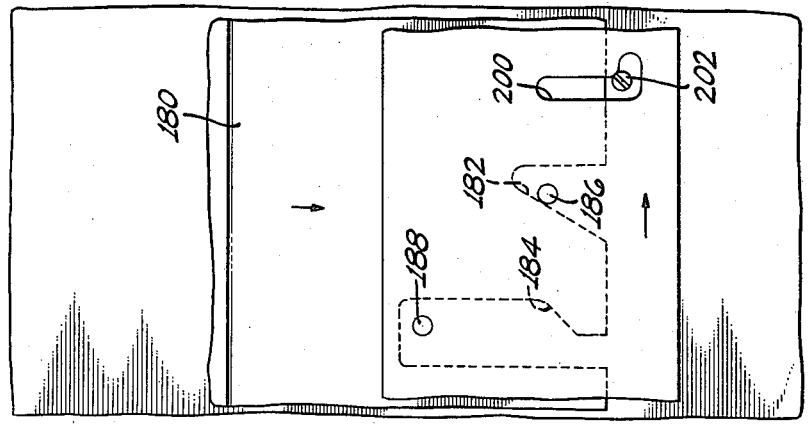
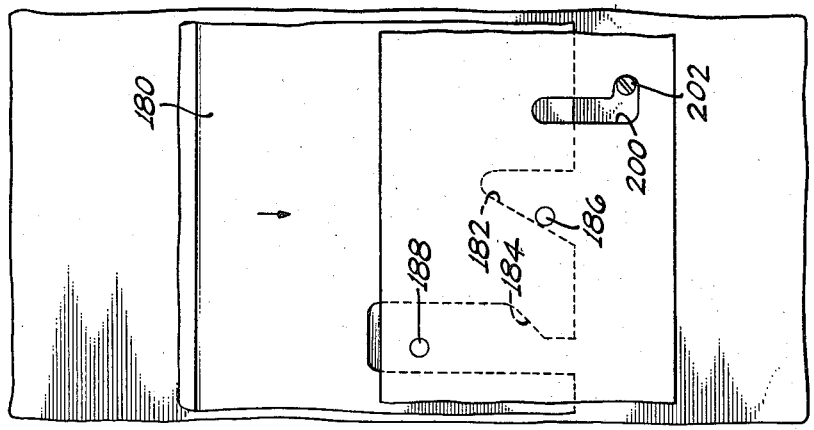
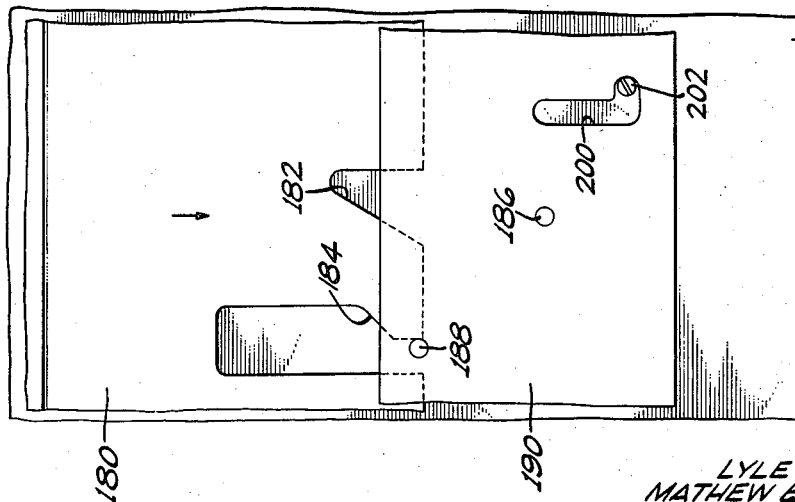

United States Patent Office 3,101,117
Patented Aug. 20, 1963

3,101,117
WELL TREATING METHOD AND APPARATUS
Lyle B. Scott, South Gate, and Mathew B. Riordan, La Habra, Calif., assignors to BJ Service, Inc., Long Beach, Calif., a corporation of Delaware
Continuation of abandoned application Ser. No. 616,333, Oct. 16, 1956. This application June 19, 1961, Ser. No. 120,872
30 Claims. (Cl. 166—67)

This invention relates to the treatment of wells and especially oil and gas wells.

This application is a continuation of our pending application, Serial No. 616,333, filed October 16, 1956 for Well Treating Method and Apparatus, now abandoned.

In the art of drilling and completing wells, and particularly oil and gas wells, various occasions arise during which it is desirable that fluids be injected into the well under greater or lesser pressures. The pumping of such fluids may be desirable for the purpose of increasing the productivity of earth formations through or into which a well has been drilled, as by hydraulic fracturing. Similarly, it may be desirable for the purpose of cleaning perforations, liners and the like in the well, or indeed earth formation extending outwardly from the well. Again, fluid may be pumped into a well to remove water blocks or cones retarding production. It may be pumped into a well to consolidate sand, gravel and like materials adjacent the well bore. It may be pumped in for acidizing purposes. Additionally, in cementing operations cement slurry is pumped into wells for the purpose of anchoring casing, for the purpose of isolating various zones of the well and the like.

In these operations it is frequently necessary to obtain high fluid velocity rates, i.e., injection rates, or high pressures, the addition of considerable energy to the fluid system being consequently required. Thus, for example, in hydraulic well fracturing wherein oils or other fluids of varying characteristics are pumped into the well and from the well out into the formation for the purpose of fissuring or fracturing the formation to increase its permeability and hence its ability to produce oil, commercial experience has shown that oftentimes pressures extremely difficult to obtain become necessary. Similarly, commercial experience has established the value of high injection rates in this type of operation. In order to obtain the necessary pressures and/or the desired injection rates pumping equipment at the surface capable of delivering large amounts of energy to the fluid being pumped is required. Since the fracturing fluid must be pumped from wellhead to well bottom through casing or tubing, as the case might be, friction losses are involved which pose formidable problems, becoming ultimately insurmountable, even despite the willingness of the operator to provide virtually unlimited pumping capacity at the well site. The difficulty is present in greater or lesser degree in all the above mentioned operations, and such difficulty is two-fold, it being both an economic difficulty, and given the necessity of sufficiently high injection rates, a problem physically impossible of solution.

In the copending application Serial No. 616,333 filed October 16, 1956, by Mathew B. Riordan, Jr., there is disclosed a method which provides an ideal solution to the aforesaid general problem. That method negatives the problem of frictional losses in all substantial respects so far as the added energy which supplements the energy afforded by the pumping units is concerned. This is accomplished through the use of a gas generating means placed adjacent the point of egress of the fluid from the tubing or well casing, the energy supplied by the gas sharply increasing the fluid flow rate and/or pressure, and at the same time avoiding friction loss for the reason that the fluid in advance of the gas need not pass from well head to egress point through substantial distances of pipe.

The primary object of the present invention is to provide apparatus which is particularly well suited to the performance of the above-mentioned method, as well as to provide an improved method of boosting fracturing or other fluid pressure in a well.

Specifically, it is an object to provide a method and means for introducing fluid under pressure into earth formation through which or into which a well has been drilled, including means for pumping fluid through the well, a container adapted to be lowered in the well and positioned adjacent the earth formation, gas generating material within the container, said gas generating material being one of diverse types of so-called slow burning propellants such as rubberized ammonium nitrate, sodium or ammonium nitrate impregnated sawdust, one of a number of types of rocket fuels, and the like, and means for igniting the gas generating material.

Another object is to provide apparatus according to the preceding objective, wherein the propellant container is positioned in the well by the tubing string, and wherein novel means are provided for dropping a plug from the earth surface without reducing fluid pressure in the well, the propellant container having a firing head adapted to be actuated by said plug as the latter is forced into engagement with the firing head by the flow of pressure fluid, whereby the propellant is ignited to substantially boost or implement the effective fluid pressure applicable to the earth formation.

Since the nature of various formations will generally vary widely, different conditions will be encountered. Frequently, extremely high pressures will be necessary in order to accomplish the fracturing of the formation. On the other hand, relatively permeable formations may be encountered in which case effective fracturing pressures are difficult of attainment, due simply to fluid loss into the formation. After fracturing it is desirable to introduce as much sand as is possible into the fissures in the formation, and sufficient flow rates must be continuously maintained so that the sand may be retained suspended in the fluid lest it be dropped within the well bore to require a shutting down of operations and a bailing out of the well. It will be apparent, therefore, that continuous high flow rates are important and indeed essential to successful fracturing and that higher flow rates produce optimum results. As aforesaid, however, continuous flow rates have depended upon the energy delivered to the system by the surface pumps, and the long lengths of tubing usually many thousands of feet, render inevitable friction losses. As injection rates increase, regardless of the willingness of the operator to incur high expense in additional pumping equipment, these friction losses become insurmountable. Indeed, the point is rapidly reached where as injection rate at the surface is gradually increased friction losses rise until neither bottom hole pressures nor bottom hole flow rates may be further increased lest the tubing adjacent the surface of the well be burst.

Accordingly, the instant invention is utilized and energy is added to the system in the vicinity of the actual treating operation to increase flow rate and/or pressure while neither interrupting the continuous delivery of energy to the system by the surface pumps nor losing any substantial amount of the added energy to friction.

Other objects and advantages of the invention will become apparent from the following detailed description, reference being had to the accompanying drawings, wherein:

FIGURE 14 is a view similar to FIGURES 5 and 10 but showing the parts in a subsequent position;

FIGURE 15 is a downward continuation of FIGURE 14 and shows the lower end of the apparatus;

FIGURE 16 is a transverse sectional view taken on line 16—16 of FIGURE 15; and

FIGURES 17 to 21 are schematic views illustrating successive relative positions of the cam mechanism shown in FIGURES 5 and 10.

Figure 1:
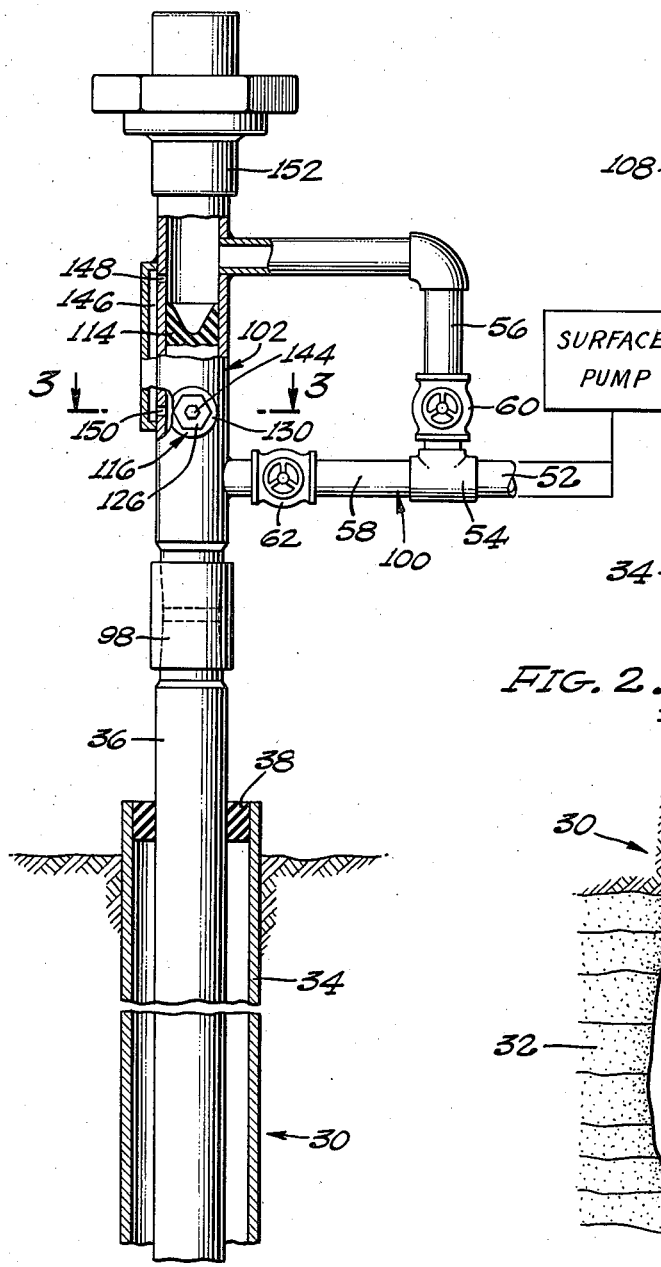
FIGURE 1 is a fragmentary view in side elevation, with certain of the parts shown in section, showing one form of wellhead apparatus made in accordance with the invention, said apparatus being particularly adapted and suited for the performance of the instant method.
Figure 2:
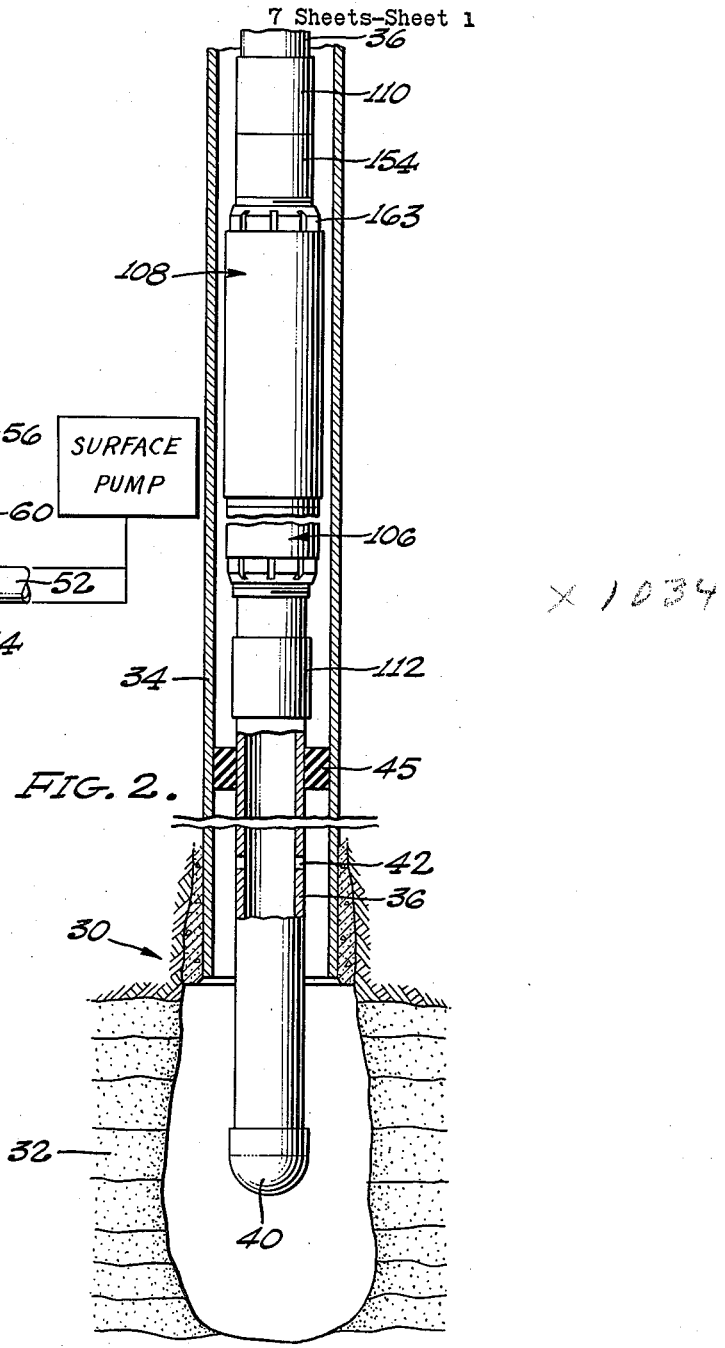
FIGURE 2 is a longitudinal sectional view of the lower portion of the well of FIGURE 1, showing bottom hole equipment made in accordance with the invention.

Referring to FIGURES 1 and 2, 30 designates a well drilled into the formation 32 with a well casing 34 cemented in place, and a string of tubing 36 suspended within the well by conventional wellhead equipment 38 and having a bull plug or other closure member 40 at its lower end. The lower end of the tubing is slotted as at 42 and the tubing is packed as at 45. In association with the packer may be conventional hold-down slips not shown.

At the ground surface, connected to a tubing string 36 by a collar 98 is a valve manifold generally designated 100. The valve manifold comprises a conduit 52 which is split by a T 54 into two conduits 56 and 58, the latter being provided respectively with valves 60 and 62 and connecting respectively with a manifold body 102 at its upper and lower portions.

A gas generator or tool 106 with associated firing head 108 is made up in the string of tubing 36 adjacent its lower end, such gas generating tool being connected at its upper extremity to the tubing 36 through an adapter 110 and at its lower extremity to the said tubing by a collar 112. The gas generator is fired by the dropping of a plug 114, which is shown in FIGURE 1, within the manifold 102, such plug being retained within the manifold by a hydraulic pin 116.

Figure 3:
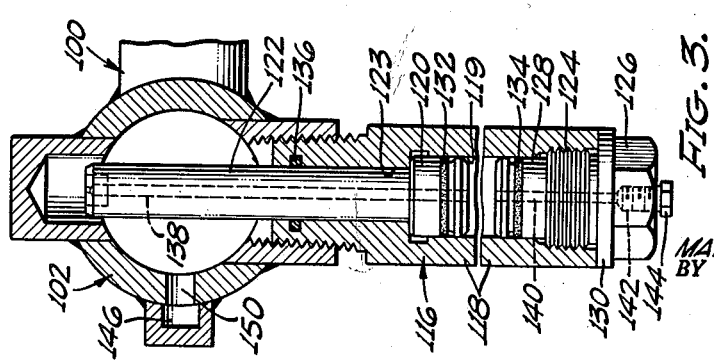
FIGURE 3 is a transverse sectional view taken on line 3—3 of FIGURE 1.
Figure 4:
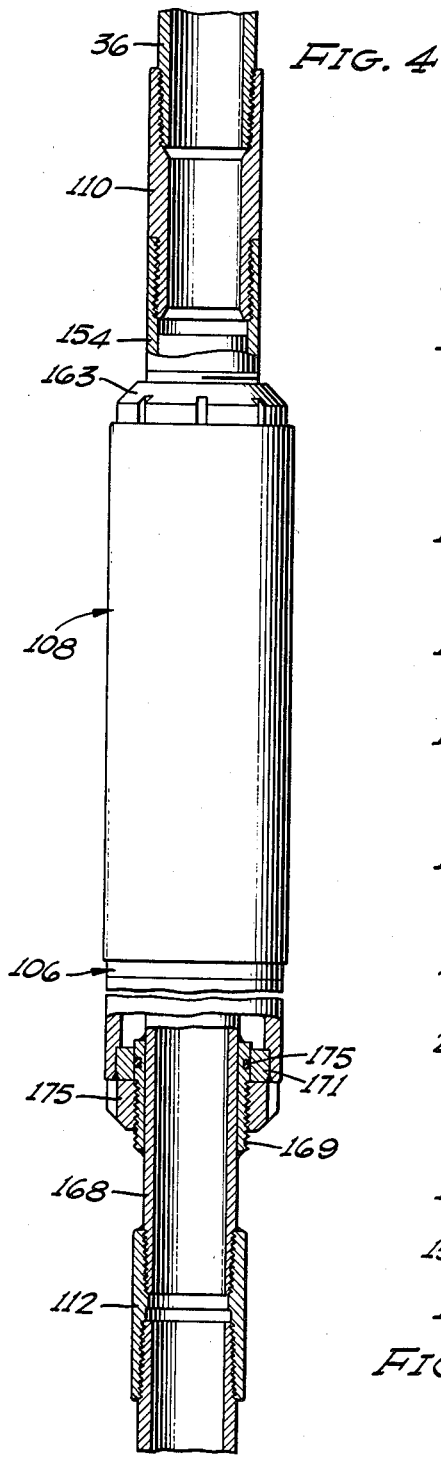
FIGURE 4 is a view in side elevation, with parts broken away, of the gas generator and firing head as installed in a tubing string.

The hydraulic pin 116, which is shown in FIGURE 3, functions to provide an improved means for dropping the plug 114 without releasing system pressure, i.e. without requiring the stopping of the surface pumps. It constitutes a cylindrical pin body 118 threaded into the manifold body 102, the pin body being bored at 119 to receive a piston 120 slidable in said bore from which piston extends the pin 122 slidable in the bore 123 of the said pin body. The outer extremity of the pin body is counter bored as at 124 and threadably receives a nut 126 from which extends into the bore 119 a plug portion 128. The nut 126 shoulders on a head 130.

O rings 132 and 134 are provided to seal respectively at the piston 120 and plug 124 and O ring 136 provides a seal between the pin body and the pin 122. A passage 138 is provided through the pin 122 and piston 120 and a similar passage 140 is provided through the plug 128, the said passage 140 being extended through the nut 126 into the counter bore 142. A screw valve 144 threads into the counter bore 142 seating against the passage 140.

Since the cross-sectional area of the piston 120 exceeds that of the pin 122, it is readily seen that the foregoing assembly provides a differential area piston. So long as the screw valve 144 remains closed, fluid pressure within the manifold 160 retains the pin 122 in its closed position across the manifold to retain the plug 114 within the manifold. Release of the screw valve 144 permits pressure to bleed away from the outer side of the piston 120 whereby fluid pressure forces the pin 122 from its closed position permitting the plug 114 to drop from the manifold 102. Subsequent closing of the screw valve 144 causes a fluid pressure buildup on the outer face of the piston 120 which returns the pin to its closed position. For the purpose of by-passing the plug 114 a passage 146 having ports 148 and 150 is provided in the manifold 102. A union or cap 152 is threaded to the upper manifold body 102.

Referring now to the firing head 108, it constitutes firing means for effecting ignition of a propellant as will hereinafter be more fully described and is actuatable upon engagement by the plug 114, the latter cooperating with the firing head to constitute means responsive to the operation of the surface pumping means for effecting such ignition of the propellant. As is best seen in FIGURES 4, 5, 10 and 14, the firing head 108 is connected to the tubing string 36 by an adapter 110, the said adapter being threaded into the firing head body 154 which itself is encompassed by a firing head case 156 sealed at its lower extremity to said body by an O-ring 158 and at its upper extremity by an O-ring 160, there being a ring 162 interposed between body and case. A nut 163 threads on the firing head body 154 to retain the case in place. A gas generator casing 164 is sealed with respect to the firing head body 154 by O-rings 166, an orifice tube 168 within said gas generator case being threaded into the lower extremity of the firing head body.

As shown in FIGURE 15, a bushing 169 is welded to the orifice tube and a ring 171 welded to the gas generator casing 164 and interposed between bushing and casing. O-ring 173 provides a seal, and the nut 175 threaded on to the bushing holds the casing in place.

As will be hereinafter described, the gas generator 106 carries a slow burning propellant, which upon being fired, generates gas within the system, thus imparting the additional energy thereto. Firing is accomplished by the firing head 108. Slidable within said firing head in the firing head body 154 and sealed with respect thereto by O-rings 170 is an inner sleeve 172, the inner sleeve 172 carrying drive lugs 174. The drive lugs 174 are adapted to slide within vertically extended slots 176 of the firing head body 154 and themselves are affixed as by screws 178 to a firing cam 180 which rotatably encircles the firing head body and includes adjacent its lower end cam surfaces 182 and 184. These cam surfaces are adapted to coact with pin followers 186 and 188, which pin followers are integral with and project inwardly from an annular hammer 190, a spring 192 being interposed between the annular hammer and the firing cam to cause the hammer to strike a plurality of circumferentially spaced firing pins 194 to fire percussion caps 196 in a manner to be hereinafter described. The firing pins 194 are slidably supported by a breech block 198 carried by the firing head body 154, a filler plug 199 being also supported by the firing head body and affixed thereto by screws 201. L-slots 200 coacting with pins 202 projecting from the firing head body 154 control descent of the hammer 190.

Figure 20:
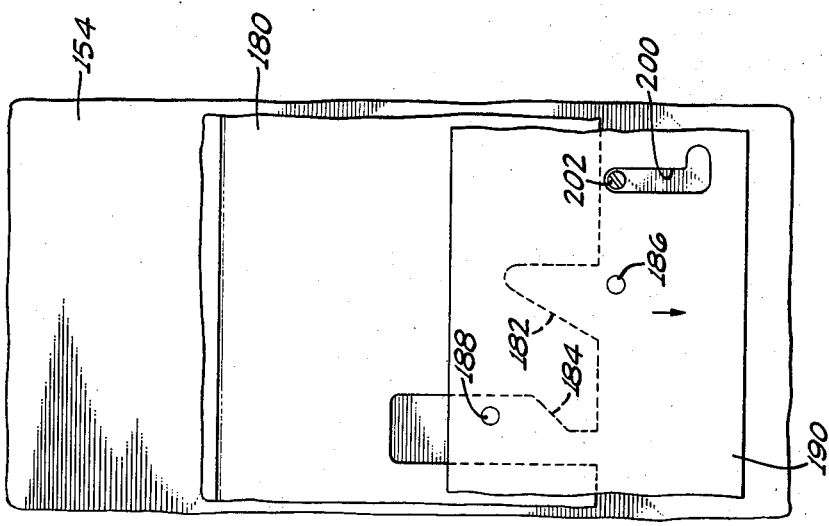
Figure 5:
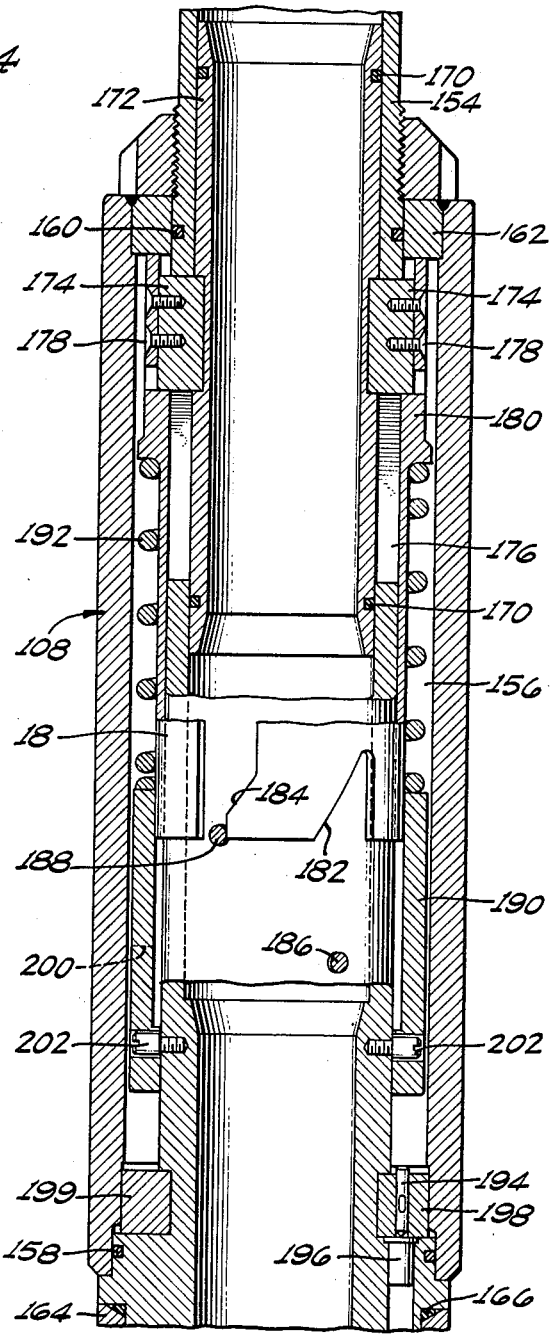
FIGURE 5 is an enlarged longitudinal sectional view of the upper portion of the apparatus of FIGURE 1, showing the parts in initial position with respect to operation.
Figure 6:
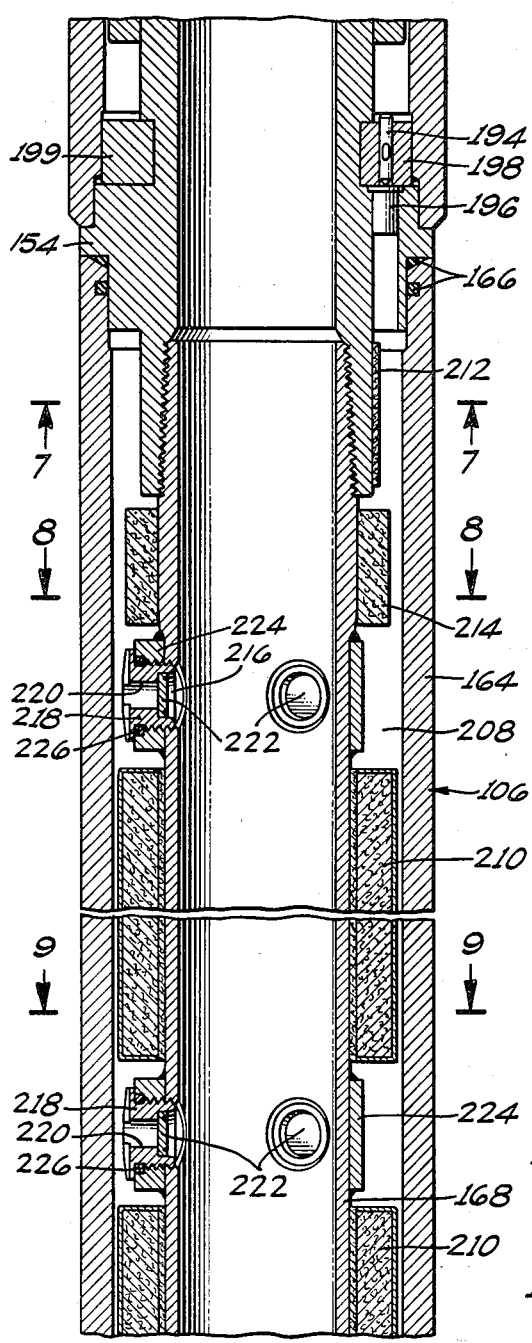
FIGURE 6 is a downward continuation of FIGURE 5.
Figure 7:
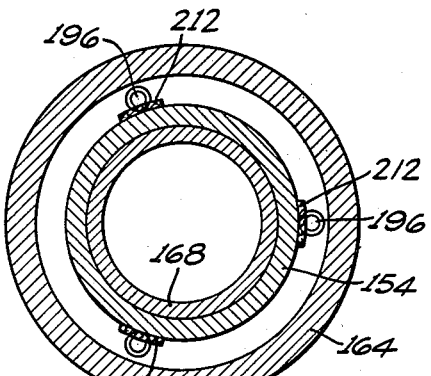
FIGURES 7, 8 and 9 are transverse sectional views taken respectively on lines 7—7, 8—8, 9—9 of FIGURE 6.
Figure 8:
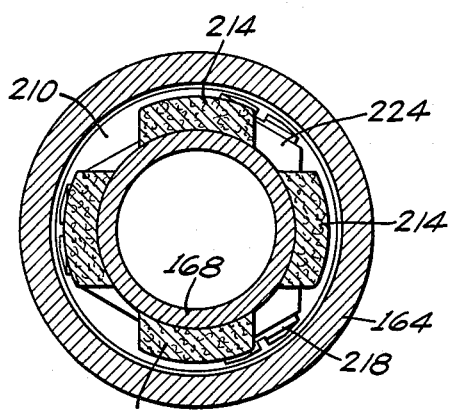
Figure 9:
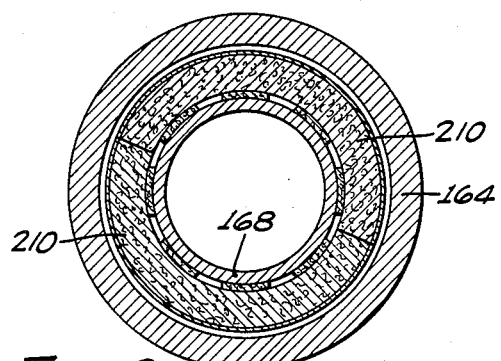
Figure 10:
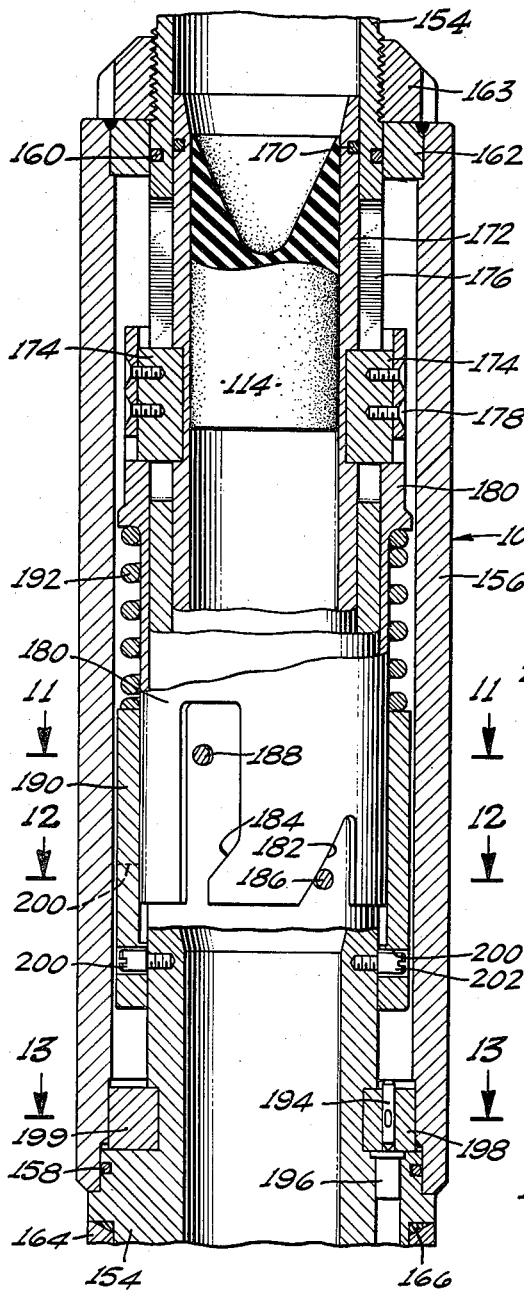
FIGURE 10 is a view similar to FIGURE 5 but showing the parts in an intermediate stage of operation.
Figure 11:
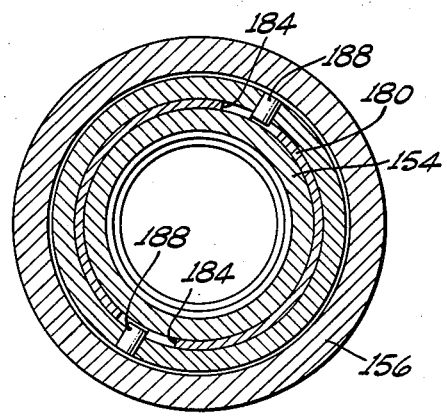
FIGURES 11, 12 and 13 are transverse sectional views taken respectively on lines 11—11, 12—12, 13—13 of FIGURE 10.
Figure 12:
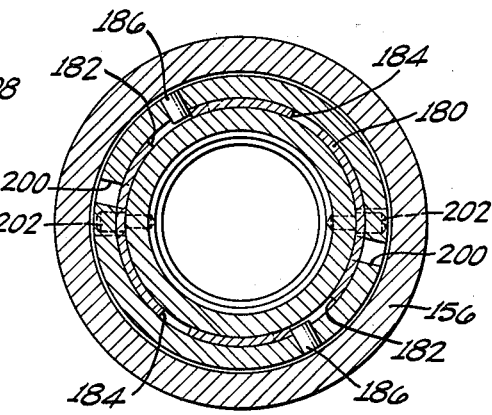
Figure 13:
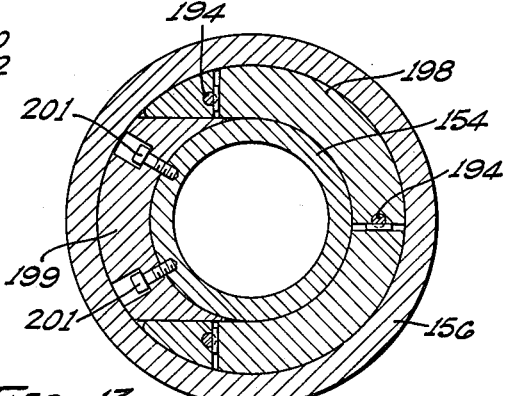

Firing of the caps 196, as previously stated, is accomplished by the hammer 190 which descends through action of the springs 192, FIGURE 5 of the drawings showing the firing head mechanism prior to firing, FIGURE 10 showing the mechanism about to fire and FIGURE 14 showing it, in part, after firing. FIGURE 17 through 21 diagrammatically show the action between the firing cam 180 and its cam surfaces 182 and 184 and the hammer 190 and its pin followers 186 and 188. When the hydraulic pin 116 is caused to permit the plug 114 to drop down through the tubing it comes to rest within the inner sleeve 172 as shown in FIGURE 10, the said plug being of resilient composition such as rubber and of such dimensions as to be wedgeable within the said inner sleeve in tight frictional fit. Fluid pressure afforded by the surface pumps then imparts through the plug 114 a downward force to the inner sleeve, which through the drive lugs 174 urges the firing cam 180 downwardly against the spring 192. This drops the firing cam 180 from its position shown in FIGURES 5 and 17 to the position shown in FIGURES 10 and 18 and pin follower 186 is caused to ride along the cam surface 182, thereby rotating the hammer 190. Rotation of the hammer 190 moves the pins 202 from the closed portions of the L-slots 200 towards the open portions thereof, as shown in FIGURE 19, until the hammer is free to descend sharply under the urging of the spring 192. This is shown in FIGURE 20, and the result whereby the said hammer drives the pins 194 into the caps 196 to fire same is shown in FIGURE 14. Firing of the caps 196 of course sets off the propellant within the gas generator 106 in manner to be hereinafter described.

From the above description it can be seen that the firing cam member 180, spring 192, pin 188, pin 202 and L-slot 200 all function to control operation of the hammer member. All those elements, therefore, can be referred to as control means for the hammer member and such reference will be made thereto hereafter.

Figure 21:
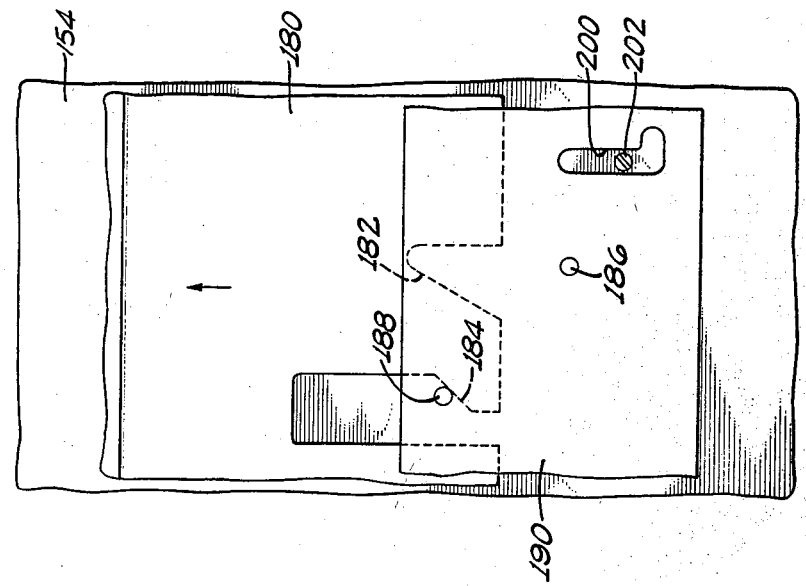

During the aforesaid operation of the tool, the plug 114, after the sleeve 172 has reached the end of its travel is caused by fluid pressure to be expelled from the sleeve and to be deposited in the lower extremity of the tubing 36. Recocking of the tool at the surface is shown in FIGURE 21, movement back of the firing cam 180 with respect to the hammer 190 and against the spring 192 causing the pin 188 to ride on the cam surface 184, thereby rotating back the said hammer until the pins 202 are disposed within the closed portions of the L-slots 200. The tool is then cocked for firing and in the position shown in FIGURE 10.

Referring now to the gas generator 106, it has already been noted that the gas generator casing 164 is sealed with respect to the firing head body 154 by O-ring 166 and with respect to the orifice tube 168 by the O-ring 173 to provide an annulus or propellant container 208, in which annulus is placed the gas generating propellant. It will be recognized that the gas generator casing 164 and the orifice tube 168 respectively constitute outer and inner shells and cooperate to form the aforementioned container 208.

The gas generating propellant used is a slow burning propellant requiring on the order of 10 seconds to burn completely and is shown in split ring form as the propellant 210. While the gas generator is shown foreshortened in the drawings, it may consist of considerable length such as, for example, 15 feet in comparison with a length of about 2 feet for the firing head. Thus, a number of split rings of propellant 210 may be utilized. The propellant itself may be one of diverse so-called slow burning propellants such as rubberized ammonium nitrate and the like. Such a solid propellant may be obtained, for example, from Grand Central Rocket Company in Mentone, California, under their designations "CBS-128K" or "CBS-128H." It may comprise ordinary railroad fusees material, such as sawdust impregnated with sodium or ammonium nitrate, or it may comprise one of a variety of rocket fuels. Suitable propellants are described in "Chemistry of Powder and Explosives," 1943, by T. L. Davis, John Wiley and Son. As is well-known, these solid propellants may be adjusted in composition to burn at varying rates, but as stated, about 10 seconds is preferable when used with the instant invention.

In order to insure firing of the propellant, as a result of firing of the caps 196, additional propellant 212 and 214 is used to form a firing train to the main bodies of propellant 210 and although varying arrangements within the skill of those trained in the art may be availed of, in the instant embodiment the propellant 212 is shown in strip from glued to the firing head body 154 terminus adjacent the caps 196. The propellant 214 is shown interposed between the aforesaid strips and the main body of propellant in strip form but glued to the orifice tube 168 and somewhat thicker, providing therefore a propellant train of gradually decreasing surface area relative to propellant volume.

Prior to the firing of the herein described tool the orifice tube 168 is subjected to the pressure of the fluid being pumped into the formation through the tubing 36. The annulus 208 is therefore sealed from such fluid, but to provide means whereby the gas generated by the propellant 210 may enter the orifice tube and hence the tubing, sealing ports 216 are provided in the orifice tube. These tubing ports 216 are sealed by plugs 218 and provided with bores 220 sealed by sealing disks 222, the said plugs being threaded into rings 224 welded to the orifice tubes. O-rings 226 provide a seal between the rings 224 and plugs 218. Since the sealing disks seat upon shoulders facing inwardly, the aforesaid plug arrangement provides an effective means to prevent fluid egress from the parts but permits upon burning of the propellant 210, the issuance of gas into the orifice tube, the sealing disks 222 being, of course, blown from the plugs 218 by the gas.

The method of the instant invention is conducted using the instant apparatus to increment the energy added to the fluid being pumped into the well by the surface pumps. The tool, in the illustrative embodiment, is run into the well as part of the tubing string. It will be understood, however, that the invention also contemplates a method wherein a solid, slow burning propellant of the type previously described is not predisposed adjacent the earth formation, but instead, such solid propellant may be contained in a container which is inserted at the well head and carried to an operative position by the pressure fluid. Before the job starts, when employing the illustrated embodiment, the plug 114 is placed within the upper portion of the manifold body 102 by removing the cap 152 and held suspended therein by the hydraulic pin 116 which is in its closed, i.e. extended, position. With the valve 60 closed and the valve 62 opened, the pumping operation is proceeded with in the usual manner utilizing the surface pumps, the passage 146 affording opportunity for the fluid pressures upon the plug 114 to balance. When it is desired to increment the energy in the system the screw valve 144 is opened, permitting opening of the hydraulic pin 116, the valve 60 being opened and the valve 62 closed. Since the surface pumps continue to run, this causes the plug 114 to be pumped down through the tubing until it reaches the inner sleeve 172 through which it is pumped. Friction between the plug and the sleeve 172, however, causes the said sleeve to move downwardly with respect to the firing head body 154, causing, as previously described, the firing pins 194 to be driven into the caps 196, whereupon flame from the said caps ignites the propellant train, gas in generated within the annulus 208 and the said gas bursts through the ports 216 passing through the tubing and driving the fluid before it into the formation.

To reuse the apparatus, the tubing must be pulled from the well and new propellant provided about the orifice tube. This is readily accomplished by the unthreading of the nut 175 and the sliding off of the gas generator casing 164. Recocking of the firing head 108 is made possible by the unthreading of the nut 163 and the sliding off of the firing head case 156.

To provide an example of the beneficial results accomplished by carrying out the method hereof with the instant novel apparatus on an actual well, General Petroleum Tonner No. 23 in the Brea Olida field was fractured and the instant invention utilized in such fracturing. Casing had been set in the well and terminated by a slotted liner hung from 2730 ft. to 3139 ft., the liner being perforated from 2795 ft. to 3139 ft. Tubing was run down into the well terminated by a perforated tail pipe acting both as a plug catcher and to carry a subsurface pressure recorder. Above the perforated tail pipe was provided a packer and slip assembly for packing off the annulus between tubing and casing and anchoring the tubing. The packer assembly was positioned at 2710 ft. Immediately above the packer was the downhole apparatus shown in the drawings and above that apparatus the tubing string. The position of the apparatus was therefore approximately 85 ft. from the perforations. Pressure gauges were provided for the tubing at the surface and at the pump truck.

The tubing and annulus were first filled with lease crude oil after which fracturing operations commenced. 20 barrels of the crude oil were pumped down the tubing at a rate of 6 barrels per minute, the bottom hole pressure, the tubing pressure and the pump truck pressure all gradually rising until during the pumping of said 20 barrels of oil breakdown pressure was achieved. Such pressure was recorded as 2500 p.s.i. at the bottom of the well, approximately 2000 p.s.i. in the tubing at the surface of the well and approximately 2500 p.s.i. at the truck.

After the displacing of the aforesaid 20 barrels of oil, but without stopping the pump truck and continuing the pumping rate of 6 barrels per minute the plug 114 was permitted to descend in the tubing. When the plug reached the firing head 108 the apparatus fired and the propellant in the gas generator 106 generated gas to provide the desired additional energy to the system. During and after the travel of the plug 114 to the firing head and the operation of the tool, additional oil was pumped into the tubing all at a rate of 6 barrels per minute. Thus pumping at the 6 barrel per minute rate was continuous from the commencement of the fracturing job until after the operation of the tool. Pressure gauges showed that when the tool fired, pressure at the bottom of the well rose to 3100 p.s.i., at the surface in the tubing to 2950 p.s.i. and at the pump truck to 3400 p.s.i. The tubing was then pulled and the tool prepared for further use. No damage appeared to be occasioned to either the tool, the wellhead equipment or the subsurface equipment.

The solid propellant used in the tool in the aforesaid illustrative operation of the apparatus in conducting of the method of the invention had a burning rate of .098 inch per second. Subsequently, and on the following day, the same well was subjected to the same treatment, using, however, a solid propellant having a burning rate of .135 inch per second. The same procedure was followed but firing of the tool and consequent gas generation caused higher pressures because of the faster burning rate of the propellant. Bottom hole pressure was indicated to be 4150 p.s.i., and pump truck pressure 3900 p.s.i. Again when the tubing was pulled no damage was evident as concerns either surface or subsurface equipment.

The foregoing establishes the effectiveness of the instant method and apparatus in affording a very substantial increment of energy available for addition to the energy provided by the pumping trucks in an hydraulic pumping operation. On the first day the addition of this energy was evidenced by a bottom hole pressure rise of 600 p.s.i., by a tubing pressure rise of approximately 1000 p.s.i. and by a pump truck pressure rise of about 900 p.s.i. On the second day the pressure differentials were respectively about 1600 p.s.i., 1300 p.s.i. and 1500 p.s.i. These pressure rises caused by the operation of the tool required no shutting down of surface pump operations. On the contrary, the surface pumps maintained a fluid flow rate of 6 barrels per minute continuously during the operations.

While the instant invention has been described particularly in connection with fracturing operations, its utility is manifest wherever it is desired to increase flow rates and/or pressures when pumping fluids into wells. As previously indicated, this operation is involved in many types of well treatments. Consequently, the invention is deemed to include that which is defined by the full scope of the following claims.

We claim:

1. Fluid injection apparatus for a well comprising, surface pumping means operable to pump fluid into the well, means for isolating a zone in said well into which isolated zone fluid is to be pumped, a container adapted to be lowered in said well, an ignitable material within said container capable upon ignition of generating gas within said well, means for releasing gas from said container to mingle with fluid in the well and fluid actuated means for effecting ignition of said material down in said well responsive to operation of said surface pumping means.

2. Apparatus as defined in claim 1, wherein said ignitable material consists of a slow-burning propellant.

3. Fluid injection apparatus for a well comprising, a tubing string disposed in the well, a container interposed in said string below the earth surface, said container having a pair of radially spaced chambers, one of said chambers communicating with the tubing, and the other chamber being closed, an ignitable material capable of generating gas upon ignition in said closed chamber, said container also having means for permitting the passage of said gas from the last-mentioned chamber into the first-mentioned chamber, firing means carried by said container for igniting said material, fluid pumping means at the earth surface above said well for pumping fluid into said well through the tubing, and means insertable into the tubing in the path of flow of the fluid to move with the fluid for actuating the firing means upon engagement therewith.

4. Fluid injection apparatus as defined in claim 3, wherein the firing means comprises a firing mechanism on said container, said firing mechanism including an axially shiftable part, means for actuating the firing mechanism upon movement of said part in one direction to ignite said ignitable material, and the firing mechanism actuating means including a plug movable along with the fluid being pumped into engagement with the axially shiftable part to shift the latter in said one direction responsive to pumping of the fluid.

5. Fluid injection apparatus as defined in claim 3, wherein said container includes a pair of concentrically axially extended shells forming said radially spaced chambers with the inner shell communicating with the tubing and providing a fluid passage through the container, said ignitable material being disposed in the chamber between said shells, and said inner shell having said means for permitting the transfer of gas from said chamber between the shells into said passage upon ignition of the material.

6. Fluid injection apparatus as defined in claim 5, wherein said ignitable material comprises a strip encircling the inner shell.

7. Fluid injection apparatus as defined in claim 5, wherein said ignitable material comprises at least one strip of a slow-burning propellant.

8. Fluid injection apparatus for a well comprising, surface pumping means operable to pump fluid into the well, a lubricator at the surface of said well, a tubing string extending into said well, means in the tubing string below the surface for generating gas to increment the pressure of the fluid being pumped, said gas generating means including a container having therein a propellant fuel capable of generating gas, said container having means for passing said gas into the tubing string and firing means carried by said container for igniting the fuel, a plug movable in said tubing string responsive to fluid being pumped into the tubing string to actuate the firing means, and means in said lubricator for releasably holding said plug, whereby upon release of the plug the plug will be moved into contact with the igniting means to actuate the same and ignite the fuel, thereby generating a volume of gas to increase the injection rate.

9. Fluid injection apparatus as defined in claim 8, wherein said firing means has a central opening therethrough which the fluid being pumped passes, said plug being compressible and of a slightly larger size than said opening and capable of being forced through said opening in the firing means subsequent to igniting of the fuel responsive to pressure from the fluid being pumped.

10. Fluid injection apparatus for a well, comprising a tubing string disposed in the well, a container located in said string below the earth's surface, said container having a flow passage communicating with said tubing, said container also having a closed chamber, an ignitible material capable of generating gas upon ignition in said closed chamber, firing means for igniting said material including a firing head having a fluid passage communicating with said tubing, said chamber having means operable to release generated gas into the tubing, fluid pumping means at the earth surface above said well for pumping fluid into the well through said tubing and through said firing head and container, and actuator means insertable into the tubing to move through the tubing for engaging and actuating the firing means upon engagement with the firing head.

11. Fluid injection apparatus as defined in claim 10, wherein said firing head includes a breech block, a firing pin shiftably disposed in said breech block, a firing element engageable by said firing pin to effect ignition of said gas generating material, and means for forcing said firing pin into contact with said firing element upon engagement of the actuator means aforesaid with said firing head.

12. Fluid injection apparatus as defined in claim 10, wherein said actuator means comprises a compressible member adapted to be forced through the passage in said firing head responsive to continued pumping of fluid through said tubing after firing of said gas generating material.

13. Fluid injection apparatus as defined in claim 10, wherein said firing head includes a hammer, means for retaining said hammer in a cocked position, means for releasing said hammer, means for shifting said hammer upon release, and a firing element operable by said hammer to effect ignition of said gas generating material.

14. Fluid injection apparatus as defined in claim 10, wherein said firing head includes an annular support, an annular hammer shiftably mounted on said support, means for releasably retaining said hammer in a cocked position, a spring operable upon said hammer to urge the latter to a firing position, means for releasing said hammer from said retaining means, an open sleeve communicating with said flow passage and shiftably mounted in said support, operating means interconnected with said sleeve and with said releasing means for operating the latter to release the hammer, and a firing element engageable by said hammer upon shifting of the hammer by said spring, said sleeve being engageable by said actuator means for shifting the sleeve.

15. Fluid injection apparatus as defined in claim 10, wherein said firing head includes an annular support, an annular hammer shiftably mounted on said support, means for releasably retaining said hammer in a cocked position, a spring operable upon said hammer to urge the latter to a firing position, means for releasing said hammer from said retaining means, an open sleeve communicating with said flow passage and shiftably mounted in said support, operating means interconnected with said sleeve and with said releasing means for operating the latter to release the hammer, and a firing element engageable by said hammer upon shifting of the hammer by said spring, said actuator means comprising a compressible member of slightly larger size than the opening in the sleeve for engaging said sleeve to shift the same as aforesaid.

16. Fluid injection apparatus as defined in claim 10, wherein said firing head includes a hammer, means for operating said hammer, and a firing element engageable by said hammer, said hammer operating means including a firing cam, means for releasably retaining said hammer in a cocked position, cooperative cam means on said firing cam and on said hammer for shifting said hammer to release the latter from said retaining means, and spring means for urging the hammer to a firing position.

17. Fluid injection apparatus as defined in claim 10, wherein said firing head includes a pair of concentric, axially extended, radially spaced, annular walls, an annular cam member axially shiftably disposed between said walls, the inner of said walls defining a portion of the fluid passage aforesaid, means connected to said cam member and shiftably disposed in the fluid passage and engageable by said actuator means for shifting said cam member, an annular hammer mounted in concentric relation to said cam member, spring means backed up by said cam member and acting on said hammer to urge the latter to a firing position, said hammer and said inner wall having cooperative releasable means for retaining said hammer in a cocked position, said hammer and said cam member having cooperative means for releasing said hammer retaining means responsive to relative movement of said cam member and hammer in one direction, whereby said spring means will shift said hammer into engagement with said firing means.

18. Fluid injection apparatus as defined in claim 10, wherein said firing head includes a pair of concentric, axially extended, radially spaced, annular walls, an annular cam member axially shiftably disposed between said walls, the inner of said walls defining a portion of the fluid passage aforesaid, means connected to said cam member and shiftably disposed in the fluid passage and engageable by said actuator means for shifting said cam member, an annular hammer mounted in concentric relation to said cam member, spring means backed up by said cam member and acting on said hammer to urge the latter to a firing position, said hammer and said inner wall having cooperative releasable means for retaining said hammer in a cocked position, said hammer and said cam member having cooperative means for releasing said hammer retaining means responsive to relative movement of said cam member and hammer in one direction, whereby said spring means will shift said hammer into engagement with said firing means, and said cam member and said hammer having cooperative means for returning said hammer to a cocked position upon relative movement of said cam member and said hammer in the other direction.

19. A firing head for fluid injection apparatus of the class described comprising an axially extended housing, a shell within said housing defining a fluid passage therethrough, said shell being radially spaced from said housing, an actuator sleeve shiftably carried by said shell in said fluid passage and adapted to be engaged by an actuator element carried in fluid flowing through said passage, a breech block between said housing and said shell, a firing element carried by said breech block, a hammer member movably disposed between said housing and said shell and engageable with said firing element, and hammer member control means between said housing and said shell and operatively connected to said sleeve for retaining said hammer member in a cocked position and for releasing said hammer member for movement for engagement with said firing element and for recocking said hammer member.

20. A firing head as defined in claim 19, wherein said hammer member control means includes a firing cam member, said firing cam member having means for allowing movement of said hammer member to a firing position, spring means operatively engaged with said hammer member and said cam member for urging said hammer member to a firing position, means connecting said cam member to said sleeve to shift said cam member along with said sleeve for placing said spring means under compression, and cooperative camming means on said cam member and said hammer member for releasing said hammer member from a cocked position responsive to relative movement of said cam member and said hammer member in one direction.

21. A firing head as defined in claim 19, wherein said hammer member control means includes a firing cam member, said firing cam member having means for allowing movement of said hammer member to a firing position, spring means opeartively engaged with said hammer member and said cam member for urging said hammer member to a firing position, means connecting said cam member to said sleeve to shift said cam member along with said sleeve for placing said spring means under compression, and cooperative camming means on said cam member and said hammer member for releasing said hammer member from a cocked position responsive to relative movement of said cam member and said hammer member in one direction and for moving said hammer member to a cocked position responsive to relative movement of said cam member and said hammer member in the other direction.

22. A firing head as defined in claim 19, wherein said hammer member control means includes a firing cam member, said firing cam member having means for allowing movement of said hammer member to a firing position, spring means operatively engaged with said hammer member and said cam member for urging said hammer member to a firing position, means connecting said cam member to said sleeve to shift said cam member along with said sleeve for placing said spring means under compression, one of said members having a cam surface and the other of said members having a cam follower for releasing said hammer from a cocked position upon relative movement of said members in one direction.

23. A firing head as defined in claim 19, wherein said hammer member control means includes a firing cam member, said firing cam member having means for allowing movement of said hammer member to a firing position, spring means operatively engaged with said hammer member and said cam member for urging said hammer member to a firing position, means connecting said cam member to said sleeve to shift said cam member along with said sleeve for placing said spring means under compression, one of said members having a cam surface and the other of said members having a cam follower for moving said hammer to a cocked position upon relative movement of said members in one direction.

24. A firing head as defined in claim 19, wherein said hammer member control means includes a firing cam member, said firing cam member having means for allowing movement of said hammer member to a firing position, said means for retaining said hammer member in a cocked position including an axially extended slot in one part having a terminal off-set at one end and a pin on another part projecting into said slot with said pin retaining said hammer member in a cocked position when the pin is disposed in said off-set, spring means operatively engaged with said hammer member and said cam member for urging said hammer member to a firing position, means connecting said cam member to said sleeve to shift said cam member along with said sleeve for placing said spring means under compression, and cooperative camming means on said cam member and said hammer member for moving said pin out of said terminal off-set of said slot to release the hammer for firing movement responsive to relative movement of said cam member and said hammer member in one direction.

25. A firing head as defined in claim 19, wherein said hammer member control means includes a firing cam member, said firing cam member having means for allowing movement of said hammer member to a firing position, said means for retaining said hammer member in a cocked position including an axially extended slot in one part having a terminal off-set at one end and a pin on another part projecting into said slot with said pin retaining said hammer member in a cocked position when the pin is disposed in said off-set spring means operatively engaged with said hammer member and said cam member for urging said hammer member to a firing position, means connecting said cam member to said sleeve to shift said cam member along with said sleeve for placing said spring means under compression, and cooperative camming means on said cam member and said hammer member for moving said pin out of said terminal off-set of said slot to release the hammer for firing movement responsive to relative movement of said cam member and said hammer member in one direction and for moving said pin to said off-set of the slot to retain the hammer member in a cocked position responsive to relative movement of said cam member and said hammer member in the opposite direction.

26. A firing head for fluid injection apparatus of the class described comprising an axially extended housing, a shell within said housing defining a fluid passage therethrough, said shell being radially spaced from said housing, an actuator sleeve shiftably carried by said shell in said fluid passage and adapted to be engaged by an actuator element carried in fluid flowing through said passage, a breech block between said housing and said shell, a firing element carried by said breech block, an annular hammer shiftably disposed between said housing and said shell, an annular firing cam disposed between the housing and said shell with a portion of said firing cam concentrically disposed with relation to said hammer, said shell having a vertically extended slot therethrough, means extended through said slot and interconnecting said sleeve and said firing cam, said hammer having an axially extended slot therein, said shell having a pin projecting into said slot, said slot having a terminal off-set into which said pin is adapted to project to retain said hammer in a cocked position, cooperative camming means on said firing cam and on said hammer for rotating said hammer in opposite directions responsive to relative axial movement of said hammer and said firing cam in opposite directions, for effecting movement of said pin into and out of said off-set terminal end of said slot, and a spring operatively engaged with said hammer and with said firing cam and adapted to be placed under compression upon relative axial movement of said firing cam and said hammer for forcing said hammer into engagement with said firing element upon movement of said pin out of said off-set terminal end of said slot.

27. A firing head as defined in claim 26, wherein said cooperative camming means includes a pair of cam followers carried by said hammer in axially and circumferentially spaced relation, said firing cam having cam surfaces alternately engageable with said cam followers upon relative axial movement of said firing cam and said hammer to shift said hammer rotatively and effect movement of the pin aforesaid into and out of said off-set terminal end of said slot.

28. Fluid injection apparatus for a well comprising, a tubing string disposed in the well, a container interposed in said string below the earth surface, said container having a pair of radially spaced chamber, one of said chambers communicating with the tubing, and the other chamber being closed, an ignitable material capable of generating gas upon ignition in said closed chamber, said container also having means for permitting the passage of said gas from the last-mentioned chamber into the first-mentioned chamber, firing means carried by said container for igniting said material, and means insertable into the tubing and movable therethrough for engaging and actuating the firing means upon engagement therewith.

29. A firing head for fluid injection apparatus of the class described comprising an axially extended housing, a shell within said housing defining a fluid passage therethrough, said shell being radially spaced from said housing, an actuator sleeve shiftably carried by said shell in said fluid passage and adapted to be engaged and actuated by an actuator element moving through said passage, a breech block between said housing and said shell, a firing element carried by said breech block, a hammer member disposed between said housing and said shell and movable from a cocked position into engagement with said firing element to actuate the same, means for releasably holding said hammer member in a cocked position, and hammer member control means between said housing and said shell and operatively connected to said sleeve for releasing said hammer member and for recocking said hammer member.

30. A firing head for fluid injection apparatus of the class described comprising an axially extended housing, a shell within said housing defining a passage therethrough, said shell being radially spaced from said housing, an actuator sleeve shiftably carried by said shell in said passage and adapted to be engaged by an actuator element moving in said passage, a breech block between said housing and said shell, a firing element carried by said breech block, an annular hammer shiftably disposed between said housing and said shell, an annular firing cam disposed between the housing and said shell with a portion of said firing cam concentrically disposed with relation to said hammer, said shell having a vertically extended slot therethrough, means extended through said slot and interconnecting said sleeve and said firing cam, said hammer having an axially extended slot therein, said shell having a pin projecting into said slot, said slot having a terminal off-set into which said pin is adapted to project to retain said hammer in a cocked position, cooperative camming means on said firing cam and on said hammer for rotating said hammer in opposite directions responsive to relative axial movement of said hammer and said firing cam in opposite directions for effecting movement of said pin into and out of said off-set terminal end of said slot, and a spring operatively engaged with said hammer and with said firing cam and adapted to be placed under compression upon relative axial movement of said firing cam and said hammer for forcing said hammer into engagement with said firing element upon movement of said pin out of said off-set terminal end of said slot.

References Cited in the file of this patent
UNITED STATES PATENTS

| | | |
|---|---|---|
| 2,500,990 | Higginbotham et al. | Mar. 21, 1950 |
| 2,599,386 | Haynes | June 3, 1952 |
| 2,676,662 | Ritzmann | Apr. 27, 1954 |
| 2,712,355 | Hoff | July 5, 1955 |
| 2,732,016 | MacLeod | Jan. 24, 1956 |
| 2,766,828 | Rachford | Oct. 16, 1956 |
| 2,776,014 | Lee et al. | Jan. 1, 1957 |
| 2,781,099 | Chestnut | Feb. 12, 1957 |